US006451151B1

(12) United States Patent
Traise

(10) Patent No.: US 6,451,151 B1
(45) Date of Patent: Sep. 17, 2002

(54) PLACER MECHANISM AND METHOD FOR A WEB OF LINERLESS LABELS

(75) Inventor: John E. Traise, Melbourne, FL (US)

(73) Assignee: Moore Business Forms, Inc., Grand Island, NY (US)

( * ) Notice: Subject to any disclaimer, the term of this patent is extended or adjusted under 35 U.S.C. 154(b) by 0 days.

(21) Appl. No.: 08/632,216

(22) Filed: Apr. 15, 1996

(51) Int. Cl.[7] ................................................ B32B 31/00

(52) U.S. Cl. ....................... 156/264; 156/521; 156/542; 156/566; 156/567; 156/DIG. 31

(58) Field of Search ................................ 156/556, 566, 156/567, 568, DIG. 31, 361, 542, 355, 521, 264, 265

(56) References Cited

U.S. PATENT DOCUMENTS 3,587,376 A 6/1971 Hirano
4,029,537 A 6/1977 Kish
4,045,275 A 8/1977 Stohlquist et al.
4,108,706 A 8/1978 Brands et al.
4,321,103 A * 3/1982 Lindstrom et al. .......... 156/351
4,323,416 A 4/1982 Malthouse et al.
4,336,095 A 6/1982 Hoffmann
4,552,608 A * 11/1985 Hoffmann et al. ...... 156/361 X
4,589,943 A * 5/1986 Kimball et al. ......... 156/355 X
4,589,945 A 5/1986 Polit
4,604,154 A 8/1986 Fosnaught
4,707,211 A 11/1987 Shibata
4,784,714 A 11/1988 Shibata
4,801,348 A 1/1989 Takagaki
5,344,519 A 9/1994 Galchefski et al.
5,421,948 A 6/1995 Crankshaw et al.
5,573,621 A * 11/1996 Boreali .................. 156/556 X

FOREIGN PATENT DOCUMENTS

EP 0 577 241 A2 1/1994
FR 2464195 3/1981
WO WO 95/15905 6/1995
WO WO 96/16889 6/1996

* cited by examiner

*Primary Examiner*—Richard Crispino
(74) *Attorney, Agent, or Firm*—Nixon & Vanderhye P.C.

(57) ABSTRACT

A placer mechanism for a web of linerless labels for placing individual labels on a product includes a separator that separates the individual labels from the web, a buffer disposed downstream of the separator that receives the individual labels, and a buffer suspension assembly movably supporting the buffer such that the buffer is positionable to deliver the individual labels to the product. The buffer is preferably a rotatable vacuum drum that is capable of accommodating labels of various lengths and widths. In addition, the buffer suspension assembly preferably enables the rotatable vacuum drum to be displaced to meet the product to which the label is to be affixed. A method of placing individual labels is also provided.

3 Claims, 3 Drawing Sheets

PLACER MECHANISM AND METHOD FOR A WEB OF LINERLESS LABELS

BACKGROUND OF THE INVENTION

The present invention relates to a placer mechanism for placing labels on a product and, more particularly, to a placer mechanism and method for a web of linerless labels for accurately and efficiently placing individual labels on a conveyed product.

There are a number of commercial placer mechanisms for labeling products of a wide dimensional variability and size, using conventional liner-type label product either from sheeted singles or web fed rolls. These placing machines are well developed, and it is generally a simple set up to synchronize the location of the label to the product by "tacking" the label onto the product, then continuing to feed while the label attaches to the product and the liner is simultaneously removed and discarded.

With linerless labels, however, the label must be cut or detached from the web of label stock and handled with the full adhesive surface of each label exposed and ready to "grab" the first thing that the adhesive side may contact. This unwanted adhesive attraction can be reduced to acceptable levels within the cutter or burster mechanism by applying a non-stick plasma coating to all surfaces contacting the adhesive and/or by using silicon elastomer rollers, etc., but the label must be held in correct placement alignment to accurately meet the product to which the label is to be attached.

Where relatively short labels, i.e., four inches or less in length, are to be processed, they may be fed to a stationary vacuum platen that can then be driven into contact with the product by air cylinder or other mechanical means. Another method is to use a vacuum cylinder to "grab" the label emerging from the cutter, then rotate the cylinder, with label aboard, until the label leading edge correctly aligns with the product, and then transfer the label from the severing mechanism directly to the product.

Neither of these methods is satisfactory for a wide range of label sizes. The main deterrent to these simple transfer systems is that the basic feeder and cutter is, by good design, very compact, with very short paper paths to lessen the problems of label curl, static and internal jamming usually associated with any feeding aberration of these sticky labels. With the web path shortened to minimize these problems, on any label longer than the internal path from the separator, it then may be necessary to apply the label leading edge to the product while the tail end of the label is still within the separating module. Since the label is stopped during the separator cycle, a problem arises wherein if a product happens to come along, it will tend to grab the leading edge of a yet unsevered label.

Another problem is that a label being fed from the applicator must be safely separated from the product stream during feeding and aligning between the two deliveries, thus requiring that either the label must be brought to the product to which it is to be attached, or the product must be brought to the label, or both, before pressure is applied to the label/product union.

SUMMARY OF THE INVENTION

According to the present invention, there is provided a placer mechanism for a web of linerless labels for placing individual labels on a product. The placer mechanism includes a separator that separates the individual labels from the web; a buffer disposed downstream of the separator that receives the individual labels; and a buffer suspension assembly movably supporting the buffer such that the buffer is positionable to deliver the individual labels to the product.

The buffer preferably consists of a rotatable vacuum drum including a vacuum for generating a vacuum surface on the rotatable vacuum drum. The buffer suspension assembly may include an actuating cylinder pivotally supporting the rotatable vacuum drum.

A feeding assembly may also be provided. The feeding assembly feeds the web of linerless labels to the separator and feeds the individual labels to the buffer. The feeding assembly preferably includes a pair of web driving rolls that drive the web to the separator; a label guide that guides the individual labels toward the buffer; and a pair of individual label driving rolls that receive the individual labels from the label guide and that drive the individual labels to the buffer. To prevent slack, the individual label driving rolls may be configured to rotate faster than the pair of web driving rolls, and the rotatable vacuum drum may be configured to rotate faster than the individual label driving rolls.

A first sensor may be provided for the feeding assembly for sensing a cutting position of the web of linerless labels to activate the separator, and a second sensor may be provided for sensing a location of the product to activate the buffer suspension assembly to position the buffer for product label application.

The label guide preferably includes a plurality of wires attached to two support rods, wherein the wires are skewed from a centerline position of a web path. The wires may each comprise a plasma coated surface.

In accordance with another aspect of the invention, there is provided a method of placing individual labels on a product with a placer mechanism from a web of linerless labels. The method includes separating the individual labels from the web; transferring the individual labels to a buffer; and positioning the buffer to deliver the individual labels to the product.

The method may further include generating a vacuum surface on the rotatable vacuum drum, and/or, prior to the separating step, feeding the web of linerless labels to the separator. The placer mechanism is preferably provided with a feeding assembly including a pair of web driving rolls that drive the web to a separator for the separating step, a label guide that guides the individual labels toward the buffer, and a pair of individual label driving rolls that receive the individual labels from the label guide and that drive the individual labels to the buffer, wherein the method may further include rotating the individual label driving rolls faster than the pair of web driving rolls, preferably about 5% faster. The buffer may consist of a rotatable vacuum drum, wherein the method includes rotating the rotatable vacuum drum faster than the individual label driving rolls, preferably about 10% faster.

During the separating step, the method may include pivoting the label guide to maintain a clear path for the individual labels. In addition, the method may include sensing a cutting position of the web of linerless labels to activate the separating step, and/or sensing a location of the product to activate the positioning step.

Accordingly, it is a primary object of the present invention to provide a novel and improved placer mechanism and method for a web of linerless labels for placing individual labels on a product that can accommodate linerless labels of various sizes and in a manner that enables accurate and efficient placement of the labels.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

Figure 1:
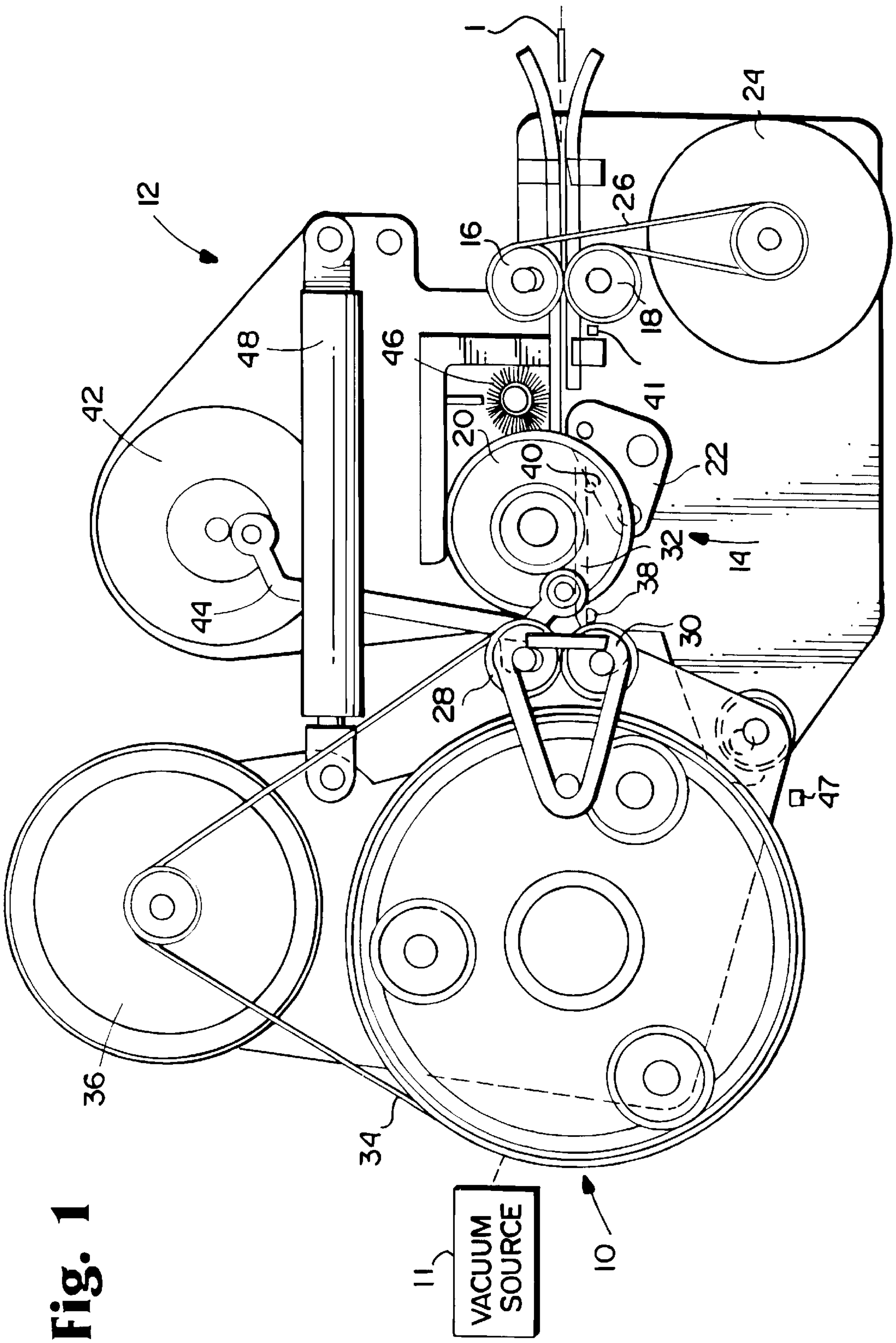
FIG. 1 is a side view of the placer mechanism according to the present invention.
Figure 2:
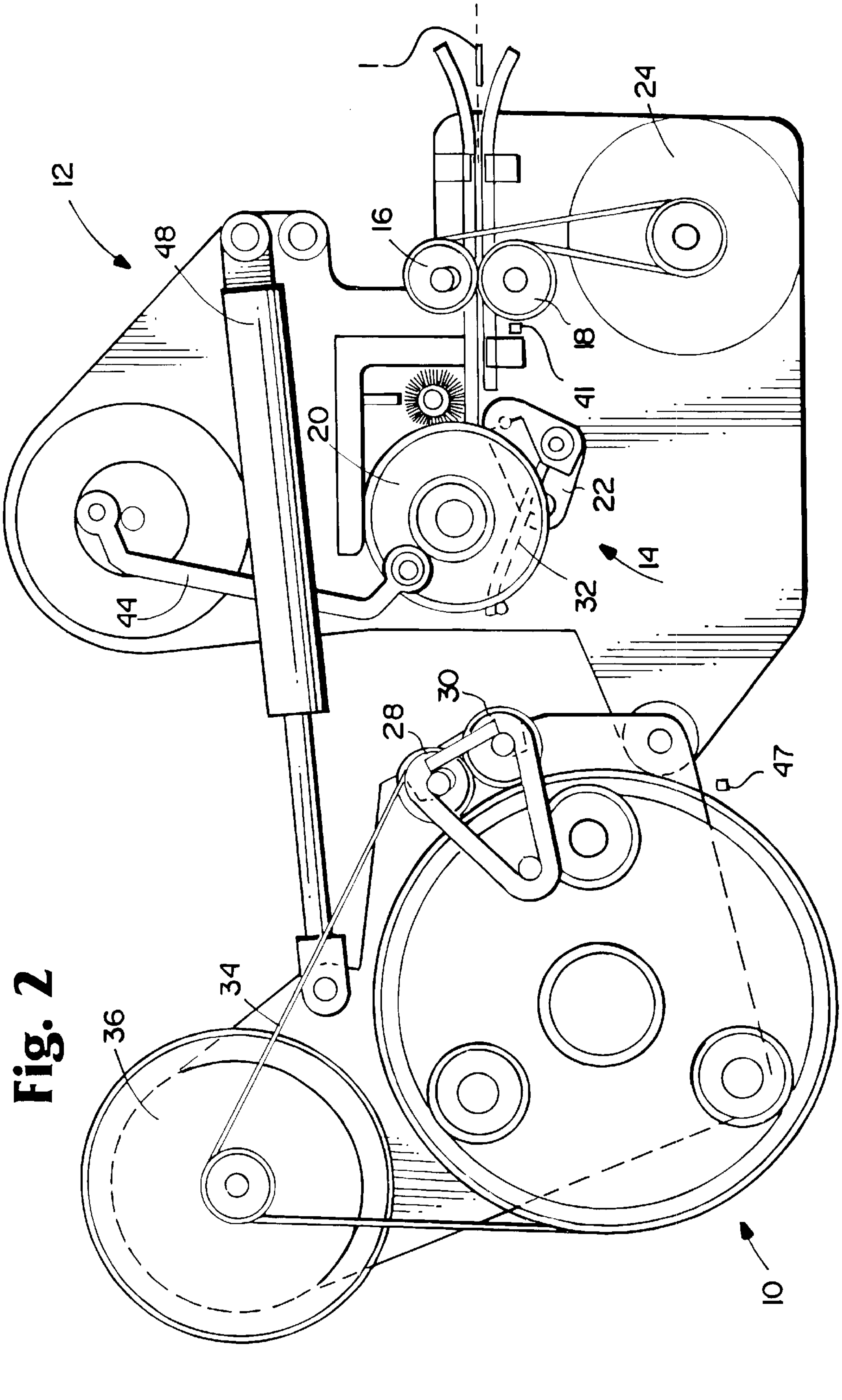
FIG. 2 is a view like that of FIG. 1 only illustrating the placer mechanism in the label placement position.

FIGS. 1 and 2 illustrate the placer mechanism of the present invention in a feed-separate mode and a label application mode, respectively. Main components of the placer mechanism include a buffer or rotatable vacuum drum 10 connected to a vacuum source 11, a buffer suspension assembly 12 supporting the buffer 10, and an exemplary separator 14 for separating the individual labels from the web. The details of the exemplary separator 14 are described in U.S. Pat. No. 5,853,117 to Traise, the disclosure of which is hereby incorporated by reference. The details of the separator 14 will therefore not be further discussed.

A web 1 of linerless label stock is fed by a pair of web driving rolls 16, 18 into a throat between a rotary separator cylinder 20 of the separator 14 and a fixed knife (or snubbing bar) 22 of the separator 14. The driving rolls 16, 18 are belted and driven together by motor driving means 24 through a belt 26. The belt 26 and the crowned driving surfaces of the rolls 16, 18 are designed to slip relative to each other as necessary to maintain drive roll cooperation. The web 1 is advanced from right to left in FIGS. 1 and 2 and is guided into a pair of take away rolls or label driving rolls 28, 30 by a guide rod assembly 32. The take away rolls 28, 30 are belted together with the buffer 10 by a common driving belt 34 and motor driving means 36. The belt 34 and crowned driving surfaces on the rolls 28, 30 and the buffer 10 are designed to slip, as necessary, in order to maintain drive surface cooperation between the rolls 28, 30 and to ensure a smooth "lie" of the individual labels on the buffer 10 and to maintain pull up tension between the web driving rolls 16, 18 and the label driving rolls 28, 30.

The guide rod assembly 32 includes a plurality of wires or rods attached to at least two transverse support rods 38, 40. The support wires of the guide rod assembly 32 come in contact with the adhesive side of the linerless label web 1, and the support wires are therefore plasma non-stick coated to reduce the adhesion tendency to minimal limits. In addition, the wires are attached to the support rods 38, 40 so that each wire is skewed outwardly from the center line position of the web path to eliminate the tendency of the label stock to "track" or get caught on the edge of a wire, as may occur if the wire is mounted parallel to the web travel center line.

The peripheral speed of rotation of the feed rolls 16, 18 will be at a given surface speed n, and the take away rolls 28, 30 will be belted to provide a surface speed of about 5% over n. This ensures that any slack in the label web 1 suspended between the feed rolls 16, 18 and the label driving rolls 28, 30 will be removed by the time that the web 1 is in correct position for cutting (or bursting) by the separator 14.

As the leading edge of the severed label emerges from the individual label driving rolls 28, 30, the leading edge proceeds to the buffer or vacuum drum 10. The vacuum drum 10 rotates clockwise as viewed in FIGS. 1 and 2, causing the leading edge of the label to be deflected downward, and the label is subjected to the vacuum traction of the drum 10. The surface speed of the drum 10 is controlled to be approximately 10% higher than the surface speed of the label driving rolls 28, 30 so that the label lies smooth against the vacuum drum 10 surface. Movement continues until a sense mark preprinted on the web 1 passes a photodetector 41 at which position the label web 1 and the label to be severed will be in accurate sever position. The web feed components are then stopped for operation of the separator 14.

The separator 14 will then sever or burst the label from the web 1. As illustrated, a drive means 42 actuates the separator 14 through a crank arm 44. The details of the severing process are described in the above-noted co-pending application, and further description will not be provided.

With continued reference to FIGS. 1 and 2, the guide rod assembly 32 pivots about the support rod 38 through rotation of the rotary separator cylinder 20 of the separator 14. The support rod 38 is mounted in a pair of pivot bearings (not shown), and the support rod 40 is deflected by components of the rotary separator cylinder 20, which are described in detail in the above-noted co-pending application. After the guide rod assembly 32 is pivoted to the position illustrated in FIG. 2 and the severed or bursted label is past, the guide rod assembly 32 is urged back to the position illustrated in FIG. 1 by springs (not shown). The pivoting ability of the guide rod assembly 32 thereby provides additional support for the label web 1, particularly for wider labels.

Figure 5:
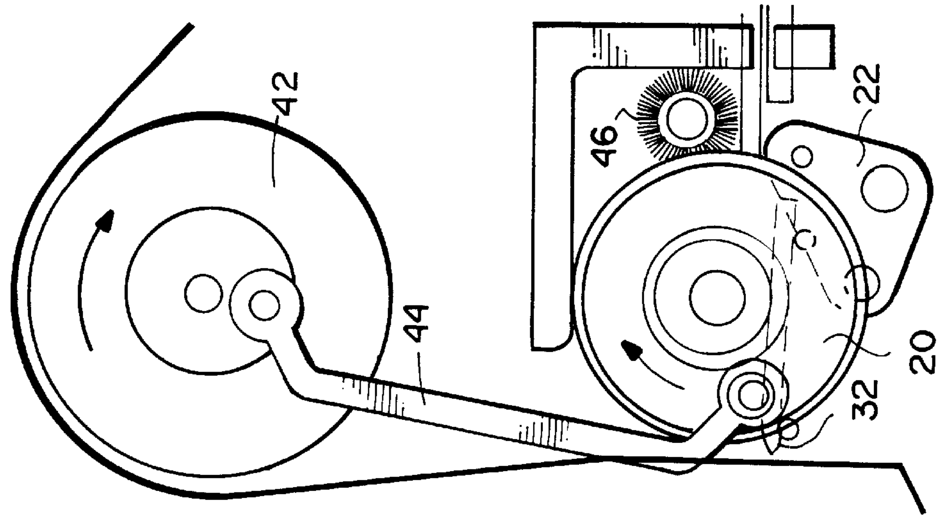
FIGS. 4 and 5 are views like that of FIG. 3 only illustrating the components in full cutting position and oil sweep position, respectively.
Figure 3:
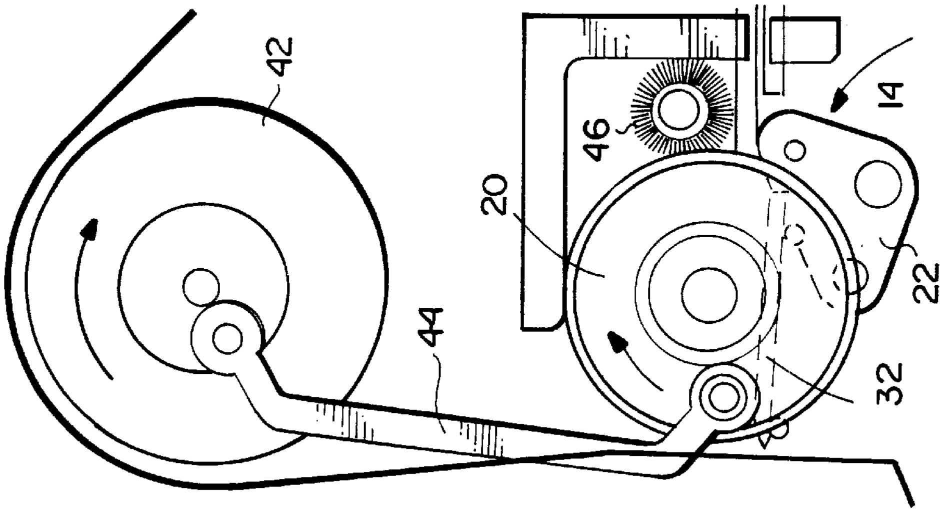
FIG. 3 is a view like that of FIG. 1 illustrating only the separator cylinder, drive cylinder and crank arm of the placer mechanism in its home position.

Following cutoff of an individual label from the web 1, the individual label driving rolls 28, 30 and the vacuum drum 10 are rotated until the severed label is completely held on the vacuum drum 10. Next, the separator 14 is cycled to bottom dead center of the operating crank 44, at which position the rotatory knife of the cutoff cylinder 20 is in contact with the silicon felt wicking roll 46, as described in the above-noted co-pending application, to ensure that the knife, with a light coating of silicone, continues to reject any fugitive adhesive picked up from the adhesive face of the web 1 at the cut line. This position is illustrated in FIG. 5. The operating crank 44 is then cycled to a normal label feeding position to begin the next feed cycle as illustrated in FIG. 3. Finally, the web driving rolls 16, 18 are reversed, and consequently the web 1 is reversed, approximately 0.050 inches, or just sufficient to "break" any fugitive bond of adhesive on the label web leading edge from the cutter anvil bar 22 before resuming forward motion.

Figure 4:
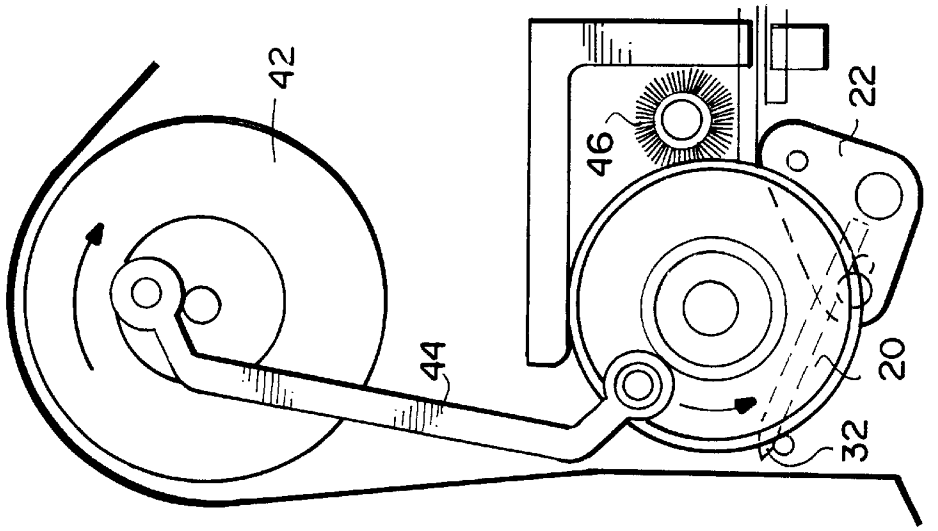

When the rotary separation cylinder 20 reaches its full downward position (driving crank 44 at top dead center—illustrated in FIG. 4), a signal provided by a positional reference initiates rotation of the individual label driving rolls 28, 30 and the vacuum drum 10. As noted above, rotation of the rolls 28, 30 and the vacuum drum 10 then continues until the severed label is completely secured to the surface of the vacuum drum 10. (To minimize cycle time, during this phase of the cycle, the speed of the rolls 28, 30 and the vacuum drum 10 may be increased to the maximum speed rate practical within the drive capability.) The label secured on the vacuum drum 10 is then positioned to be attached to the product being processed by a preprogrammed controller (not shown). At this point, rotation of the vacuum drum 10 stops to wait for the product to which the label is to be affixed to come into mating position. This positioning may or may not be accomplished while the product conveyor system is similarly being driven, but for simplicity of analysis, it is assumed that the label leading edge reaches the rendezvous position before the product is in position to receive it.

At this position, the rolls 28, 30 and the vacuum drum 10 will stop until a photodetector (or other known signal means) 47 marks the tolerably correct rendezvous position of the product and conveying means. When the correct position of the product is detected, an actuating cylinder 48 of the suspension assembly 12 is fired, and the vacuum drum 10 is rotated at a programmed surface speed, either clockwise or counterclockwise, to match the surface speed and direction of the product to which the label is to be affixed. By virtue of the suspension assembly 12 and actuator 48, the vacuum drum 10 and rolls 28, 30 are descended to meet the product (as illustrated in FIG. 2), and the leading edge of the label is tacked to the product and peeled from the surface of the vacuum drum 10 as the synchronized movement of the drum 10 and the product continues. This matched motion continues until the label is completely transferred from the surface of the vacuum drum 10 to the product. At this time, the actuating cylinder 48 is retracted, and the next label feed cycle can begin.

The step-by-step cycle description above is presented serially for clarity of understanding. In actual practice, however, it may be desirable to overlap several of the steps described, wherever possible, to improve total cycle time. It is significant to realize the importance of being able to adjust the speed rates and direction of rotation of each of the three driving motors (or actuators) individually. By doing so, under control of detectors and the system microprocessor controller, accurate placement control, high cycle rate and maximum versatility of placement geometry can be achieved.

The photosensors 41, 47 make possible a logically derived fault detector algorithm, which is preferably programmed to immediately stop one or more of the individually driven feed mechanisms if any programmed combination of "white" (label detected) and/or "black" (label not present), is determined as "not acceptable" by the microprocessor control algorithm. The purpose of stopping the offending feed mechanism is to prevent unrecoverable mutilation of label stock. Upon fault detection, the microprocessor provides a signal to the operator via a display similar in concept to contemporary high-speed copiers, printers and other paper handling mechanisms.

It is also possible to incorporate audit verification via sequential or derived bar code reading if labels being processed must achieve 100% security or if each product must be mated with a specific label. On-line printing of labels in the extension of the microprocessor control algorithm is not a specific part of the present invention, but is an advantageous feature extension of the system carried with the processing control above. It would be a relatively simple task to bypass any product coming down the line if the bar code on the label did not match the bar code on the product, for example, thereupon shunting the product for manual handling or other secondary processing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of placing individual labels on a product with a placer mechanism from a web of linerless labels, the method comprising:

(a) feeding the web of linerless labels to a separator;

(b) separating the individual labels from the web of linerless labels; then (c) transferring the individual labels to a buffer; and (d) positioning the buffer to deliver the individual labels to the product, wherein the placer mechanism comprises a feeding assembly including a pair of web driving rolls that drive the web to a separator for the separating step, a label guide that guides the individual labels toward the buffer, and a pair of individual label driving rolls that receive the individual labels from the label guide and that drive the individual labels to the buffer, and wherein step (a) is practiced in part by rotating the individual label driving rolls faster than the pair of web driving rolls, and during said separating step, pivoting the label guide to maintain a clear path for the individual labels.

2. A placer mechanism for a web of linerless labels for placing individual labels on a product, the placer mechanism comprising:

a separator that separates the individual labels from the web of linerless labels;

a buffer disposed between the separator and the product, said buffer receiving the individual labels;

a buffer suspension assembly movably supporting said buffer so that said buffer is positionable to deliver the individual labels to the product; and a feeding assembly that feeds the web of linerless labels to said separator and that feeds the individual labels to said buffer, wherein said feeding assembly comprises:

- a pair of web driving rolls that drive the web to said separator,
- a label guide that guides the individual labels toward said buffer, wherein said label guide comprises a plurality of wires attached to two support rods, said wires being skewed from a centerline position of a web path, and
- a pair of individual label driving rolls that receive the individual labels from said label guide and that drive the individual labels to said buffer.

3. A placer mechanism according to claim 2, wherein said wires each comprise a plasma coated surface.

* * * * *